July 8, 1941.  J. W. BRUNDAGE  2,248,060
TIRE VULCANIZING PRESS
Filed July 1, 1938  2 Sheets-Sheet 1

INVENTOR.
James W. Brundage.
BY Fay, Oberlin & Fay
ATTORNEYS.

July 8, 1941.  J. W. BRUNDAGE  2,248,060
TIRE VULCANIZING PRESS
Filed July 1, 1938  2 Sheets-Sheet 2

INVENTOR.
James W. Brundage
BY Fay, Oberlin & Fay
ATTORNEYS

Patented July 8, 1941

2,248,060

UNITED STATES PATENT OFFICE 2,248,060

TIRE VULCANIZING PRESS

James W. Brundage, Akron, Ohio, assignor to The Summit Mold & Machine Company, Akron, Ohio, a corporation of Ohio Application July 1, 1938, Serial No. 216,900

3 Claims. (Cl. 18—38)

This invention relates, as indicated, to vulcanizers, such as are used in vulcanizing rubber tires, and has reference more particularly to improvements in the mold sections of such vulcanizers. Tire vulcanizing presses necessarily include a split mold, the sections of which are separated upon completion of the vulcanizing operation, and where the tire, or tire casing, has as usual a deeply ribbed or configured tread, and especially if the tire is of large size, the stripping of the tire from the mold presents a problem of no small difficulty.

A primary object of the invention is to provide mold sections which are so constructed as to effect a substantially automatic stripping action of the molded article from the mold sections upon separation of such mold sections, without requiring any special ejecting device or like means.

To the accomplishment of the foregoing and related ends, said invention, then, consists of the elements hereinafter fully described and particularly pointed out in the claims.

The annexed drawings and the following description set forth in detail certain structure embodying the invention, such disclosed elements constituting, however, but one of various structural forms in which the principle of the invention may be used.

Figure 1:
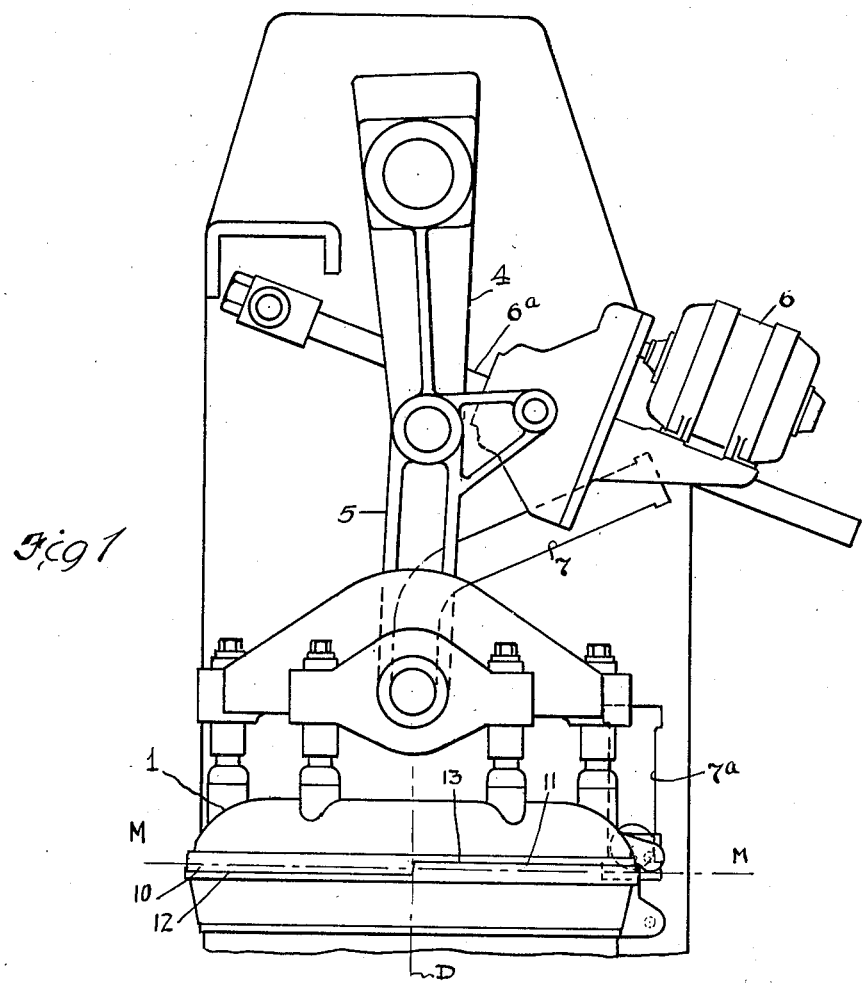
Fig. 1 is a side elevation of a tire vulcanizer or press embodying the invention, with portions omitted in order to more clearly show the mold sections in closed position.
Figure 2:
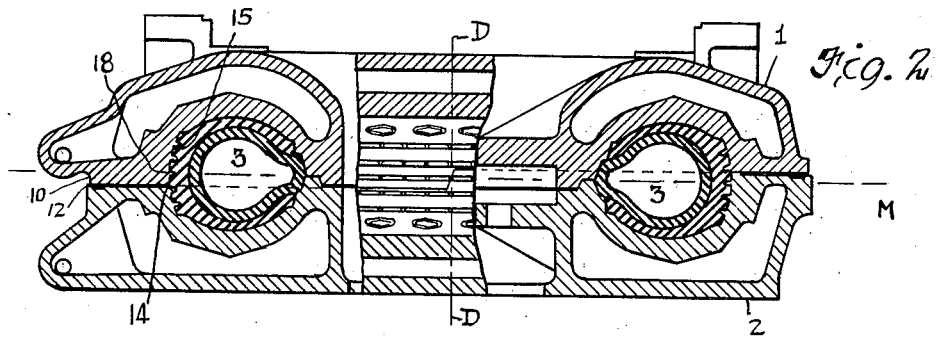
Fig. 2 is a cross-sectional view through the mold sections in closed position, apart from the press and on larger scale than in Fig. 1.
Figure 3:
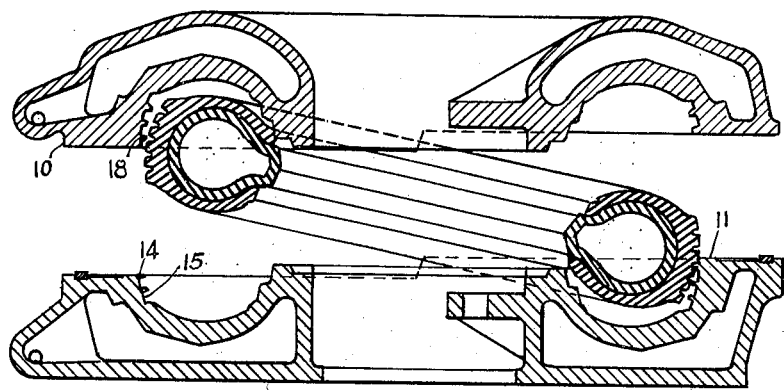
Fig. 3 is a view similar to Fig. 2, but showing the mold sections in partially opened position.

Referring more particularly to Figs. 1, 2 and 3, it may be noted that the vulcanizer or press therein shown is to be regarded merely as typical, although actually such press is similar to one shown in my copending patent application, Ser. No. 213,402. Such vulcanizer press includes upper and lower mold sections, 1 and 2, respectively, the upper mold section being movable into contact with the lower mold section to define therebetween a curing chamber 3 for the tire to be cured. After the curing operation, the upper mold section is moved relatively to the lower mold section, and the initial portion of this movement is in a rectangular path at right angles to the plane of the lower mold section, such movement being continued in the same or different path until the cured tire is exposed for removal from the curing chamber.

In the particular press illustrated, the one mold section is thus moved by means of togglelinks 4 and 5, operated by an electric motor 6 through a threaded link 6ª, the path of movement of the mold section, both in opening and closing, being defined by guide-grooves 7 and 7ª in the supporting frame.

It will be understood that the present improvements relate primarily to the construction of the mold parts or sections, whereby on their separation the cured tire is automatically stripped or freed from such sections, to an extent sufficient to permit the ready removal of such tire. Heretofore, the meeting face of the mold sections has always been disposed in a plane, generally a plane coinciding with the median plane of the tire, such plane being indicated by the dotted line M in Figs. 1 and 2 of the drawings, and extending normal to the plane of the drawing. This has often rendered difficult the removal of a tire, and more especially a tire casing with deeply configured tread, which has a tendency to cling to one or the other of the mold sections, and must be removed therefrom by manual manipulation.

These difficulties have been overcome in the form of my present invention illustrated in Figs. 1, 2 and 3, by making the mold sections in such a manner that a portion 10 of the upper mold section, at one side of a diametral plane D extends below the medium plane M, and a portion 11 of the lower mold section, at the opposite side of said diametral plane, extends above said median plane. This provides a parting face for the mold sections, a portion 12 of which is somewhat below the median plane M and the other portion 13 of which is spaced somewhat above said plane. The relation just described is reversed to the other side of the diametral plane D.

With this construction of the mold sections, it will be noted that, considered with reference to the axis of the mold sections, the radially inward edge 14 of the parting face 12 intersects the transversely curved tread face 15 of the mold sections at a point further inward radially than the point 18 at which the median plane intersects such tread face.

As a result, when the mold sections are separated, whether this be by elevating the upper section or lowering the lower section, the portion 10 of such upper section will lift the adjacent portion of the tire from the lower mold section, the other portion of the tire being temporarily retained in the lower mold section by the portion 11 of the latter. In order words, as clearly shown in Fig. 3, the tire is given an angular movement, about the portion 11 of the lower mold section, which portion 11 acts as a fulcrum during the movement. As this movement proceeds, the tire is automatically stripped from the tread faces of both mold sections, and is thus easily removed by the operator, who does not have to pry the tire loose, but merely removes it from the mold sections between which it loosely rests.

Figure 4:
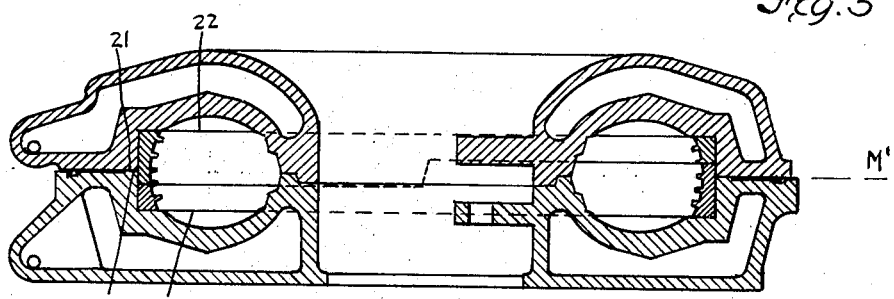
Fig. 4 is a sectional view of one side of a pair of mold sections, as illustrated in Fig. 2, but illustrating a modification in their construction.

It is known practice in tire vulcanizing presses, instead of making the mold sections of an integral casting, to provide the same with an annular insert, particularly in the outer periphery of the mold cavity which forms the tread portion of the tire or tire casing. Such inserts may, if desired, be removable to permit interchange thereof, and they are frequently made of a different metal from that of which the body of the mold section is formed. My present improved mold construction may be readily utilized in this type of mold, as illustrated in Fig. 4. In such case, the meeting faces of the mold sections proper, 20 and 21, will lie in a single plane $M^1$, e. g., a median plane as shown. However, the annular inserts 22 and 23 which form the tread portion of the tire or tire casing to be molded, will have their meeting faces located in part to one side of such plane $M^1$ and in part on the opposite side just as in the previously described construction of the mold sections themselves. It will be understood that wherever reference is made in the specification or the following claims to a mold section, this term connotes either an integral section or one of the composite construction as illustrated in Fig. 4.

Figure 5:
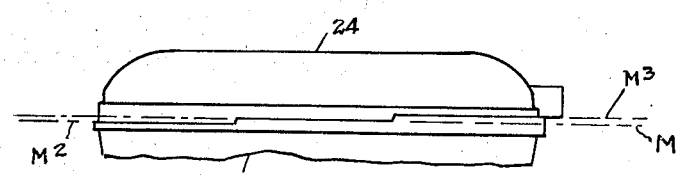
Fig. 5 is a side elevation of the mold sections, apart from the press, showing another modification in construction.

Furthermore, as illustrated in Fig. 5, the meeting faces of the mold sections may lie in more than two different planes. Thus in the figure just referred to, intermediate portions of the mold parting face of the sections 24 and 25 are shown as lying in a median plane, while the faces to one side of such intermediate portion are displaced in one direction so as to lie in an offset plane $M^2$, and on the other side to lie in an offset plane $M^3$.

Figure 6:
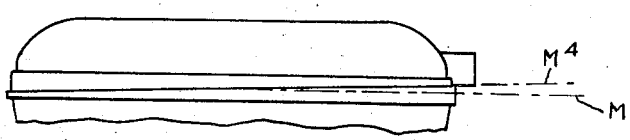
Fig. 6 is a similar elevational view of still another modified form of the invention.

In Fig. 6, there is illustrated still another modification in that the meeting faces of the mold sections, instead of being stepped so as to displace or offset the same in different planes, are uniformly inclined on a plane $M^4$, that intersects the median plane M.

The selection of the particular form or embodiment of the invention which I have thus illustrated will in part depend on the configuration of the tread surface of the tire or tire casing which is to be cured in the vulcanizing press. Where the tire tread is in the form of a plurality of encircling ribs, the disposition of the meeting faces of the mold sections in offset planes rather than in a continuous inclined plane, will be preferred, whereas the latter serve just as well or possibly better where the tread surface consists of large detached raised areas. It will also be understood that where the meeting faces of the mold sections are offset to lie in different planes, the connecting portions may be inclined more or less sharply thereto, depending upon the design or configuration of the tire tread that is being molded.

In all of the foregoing embodiments of the invention, it will be noted that the complementary mold sections are so formed that the one thereof will engage a major portion of the tire or tire casing at one side, and the other similarly engage a major portion of such surface at the other side. By thus extending the area of engagement of the respective mold sections beyond the median line of the tire being cured, as opposite sides thereof, when the mold sections are separated, the tire will have a corresponding tendency to cling to the one mold section at the one side, and the other mold section at the other. As a result, it will be swung into an angular position or canted between the mold sections incidentally to the separation of the latter, and as the separation proceeds the tire will ordinarily be completely stripped from both mold sections. All this is accomplished without imposing any special strains on the tire. Indeed, there is less danger of the latter being injured than where it is pried or otherwise manipulated, as at present, in order to free it from the one or other mold section.

Other forms may be employed embodying the features of my invention instead of the one here explained, change being made in the form or construction, provided the elements stated by any of the following claims or the equivalent of such stated elements be employed.

I therefore particularly point out and distinctly claim as my invention:

1. In a tire vulcanizer, a pair of complementary mold sections which when closed upon each other form a tire curing chamber, said mold sections so formed that substantial portions of the circumferential extent of the parting at the outer edge of the curing chamber respectively lie on opposite sides of the equatorial plane of the curing chamber.

2. In a tire vulcanizer, a pair of complementary mold sections which when closed upon each other form a tire curing chamber, said mold sections so formed that substantial portions of the circumferential extent of the parting at the outer edge of the curing chamber respectively lie parallel to but on opposite sides of the equatorial plane of the curing chamber.

3. In a tire vulcanizer, a pair of complementary mold sections which when closed upon each other form a tire curing chamber, said mold sections so formed that the parting thereof at the outer edge of the curing chamber is angularly related to and intersects the equatorial plane of the curing chamber with substantial portions of such parting lying on opposite sides of such equatorial plane.

JAMES W. BRUNDAGE.